Sept. 16, 1958 R. L. PLOUFFE, JR 2,852,609

MULTIPLEX SIGNALING SYSTEM

Filed Jan. 8, 1957 2 Sheets-Sheet 1

INVENTOR,
ROBERT L. PLOUFFE, Jr.

BY Harry M. Saragovitz

ATTORNEY.

Sept. 16, 1958 R. L. PLOUFFE, JR 2,852,609

MULTIPLEX SIGNALING SYSTEM

Filed Jan. 8, 1957 2 Sheets-Sheet 2

INVENTOR,
ROBERT L. PLOUFFE, Jr.
BY
Harry M. Saragovitz
ATTORNEY 2,852,609
Patented Sept. 16, 1958

2,852,609

MULTIPLEX SIGNALING SYSTEM

Robert L. Plouffe, Jr., Livingston, N. J., assignor to the United States of America as represented by the Secretary of the Army Application January 8, 1957, Serial No. 633,170

1 Claim. (Cl. 179—15)

The invention relates to communication systems and particularly to ringing facilities for use in multiplex telephone systems of the pulse modulated type.

In prior ringing arrangements, a means for time modulating the pulses of each channel for both voice and ringing signals was provided. However, in these systems the number of channels is limited. If a greater number of channels are utilized, interference between channels arises when two channels are signaled for ringing purposes at the same time, causing false ringing or cancellation of the ringing signal.

It is an object of this invention to provide ringing signal circuits in a multiplex pulse telephone system where the transmission of a low frequency ringing signal is independent of the time modulation of the pulses, thereby greatly increasing the number of channels to which the ringing system can be applied.

Figure 1:
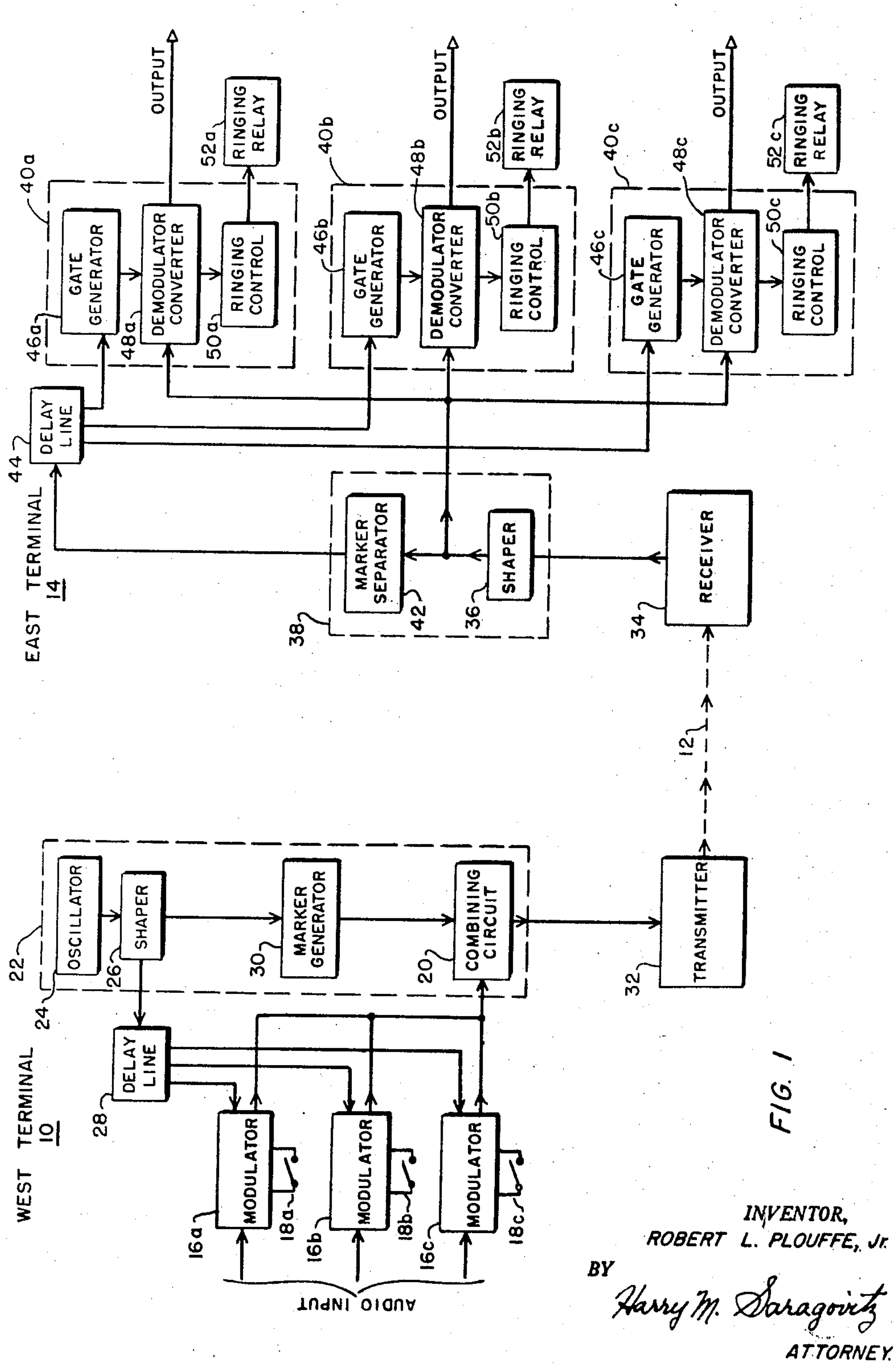
Figure 2:
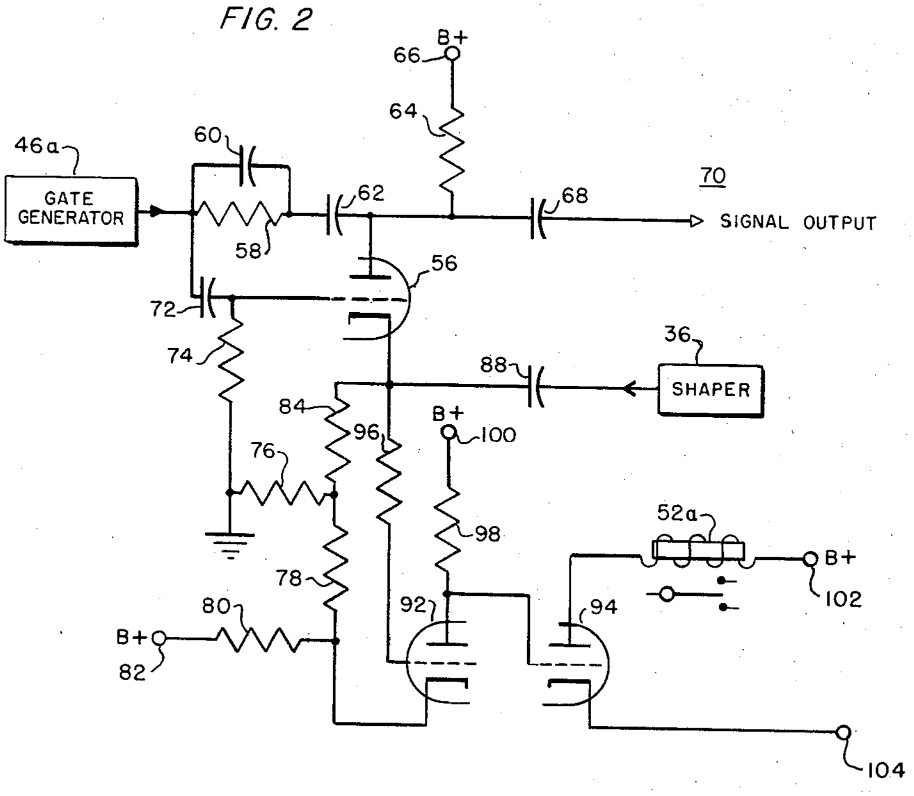

The novel features which are believed to be characteristic of the invention, both as to its organization and method of operation, together with further objects and advantages thereof, will be better understood from the following description considered in connection with the accompanying drawings, in which an embodiment of the invention is illustrated by way of example, and in which:

Figure 1 is a block diagram of a communication system incorporating the ringing signal features of this invention; and Figure 2 is a schematic circuit diagram of an embodiment of the signaling circuit of this invention for transferring a ringing voltage.

Referring to Figure 1, there is illustrated a multiplex communication set comprising a west terminal 10 coupled over transmission medium 12 to an east terminal 14.

At the west terminal 10, a plurality of independent audio signals are applied to a plurality of individual channel modulators **16*a*, 16*b* and 16*c*, respectively. The common unit 22 includes an oscillator circuit 24 for generating a sine wave signal, a shaper circuit 26 for clipping and amplifying said sine wave signal into pulses and applying them to a tapped delay line 28. The output of the shaper circuit 26 is also fed to a marker generator circuit 30, contained in common unit 22**, which produces marker pulses to synchronize the entire system.

Each pulse applied to the display line produces a plurality of equally displaced channel pulses, in this case three. Each of these pulses is applied to one of the molulators, **16*a*, 16*b* and 16*c*. Also applied to the modulators are independent audio signals which, in a manner well known in the art, modulate the timing of the channel pulses applied thereto from delay line 28**.

In the combining circuit 20, the outputs of all the modulators **16*a*, 16*b* and 16*c* are combined with the output of the marker generator circuit 30 to form the pulse train, which is the output signal of the common unit 22. Each channel modulator 16*a*, 16*b* and 16*c* includes a disabling switch 18*a*, 18*b* or 18*c* which can delete the corresponding channel pulse from the pulse train. It is this deletion which is used for ringing purposes, as will be described below. The pulse train is fed to a radio frequency transmitter 32, the output of which is amplitude modulated by the pulse train, and the modulated output is then sent over the transmission medium 12 to a receiver 34 in the east terminal 14**.

The received pulse modulated train is demodulated by receiver 34 to restore the original pulse train which is applied to a pulse shaper circuit 36 contained in common unit 38 and then to demodulator converters **48*a*, 48*b* and 48*c* included in the corresponding channel demodulator units 40*a*, 40*b* and 40*c*. The pulse train from the shaper circuit 36 which differentiates the signal is also applied to a marker separator circuit 42, included in common unit 38, which extracts the marker pulse, shapes it into a gate pulse and applies it to the delay line 44**.

As with the modulators **16*a*, 16*b* and 16*c* the relay line 44 in a similar manner provides a plurality of equally spaced gate pulses for each marker pulse, occurring in synchronism with the pulses in the output of delay line 28 at the transmitter, and establishing the time position of the channel pulses. Each resultant gate pulse is applied from delay line 44 to a corresponding gate generator 46*a*, 46*b* and 46*c* included, respectively, in the corresponding demodulator unit 40*a*, 40*b* and 40*c*. The gate generator 46*a*, 46*b* and 46*c* produces a gate for operating the demodulator converters 48*a*, 48*b* and 48*c*. The gate determines the time during which the demodulator converter accepts signals. As a result each demodulator unit demodulates only that channel pulse of the full pulse train which occurs in synchronism with the gate pulse applied to it. The pulse train is therefore separated into individual channel signals, one for each demodulator unit. The demodulator converter 48*a*, 48*b* and 48*c*** operates to convert that selected time modulated pulse which is being applied to it into the original audio signals and feeds it to the audio output circuits.

Each demodulator unit **40*a*, 40*b* and 40*c*, besides containing the circuits of each individual channel, also contains corresponding channel ringing control sections 50*a*, 50*b* and 50*c***.

In addition to applying an output voltage to the audio outputs, the demodulator converter circuits **48*a*, 48*b* and 48*c* applies another voltage, derived from a different portion of the circuit, to the ringing control sections 50*a*, 50*b* and 50*c* which when energized actuates the corresponding telephone channel ringing relays 52*a*, 52*b* and 52*c***.

In accordance with the invention herein, the closing of a selected channel pulse disabling switch **18*a*, 18*b* and 18*c* deletes a corresponding channel pulse from the pulse train and causes one of the corresponding telephone channel ringing relays 52*a*, 52*b* or 52*c*** to become energized.

Since the components represented by the subscripts *a*, *b* and *c* are similar and function in the same manner, only one of the channel circuits will be described. In the instance illustrated, the selected channel may be assumed to be the channel represented by subscript (*a*).

Figure 2 is a circuit diagram of demodulator unit **40*a* shown in Figure 1. The positive gating pulse from gate generator 46*a* is applied to the plate of triode tube 56 through the parallel arrangement of resistor 58 and condenser 60, said arrangement being connected in series with condenser 62. The circuit associated with and including triode tube 56 is the demodulator converter circuit 48*a* of Figure 1. Resistor 64 is connected between the plate of tube 56 and B+ terminal 66. Output coupling condenser 68 is connected between the plate of tube 56 and terminal 70 which feeds an output pulse train to a succeeding pulse translating circuit, not shown. The gating pulse is also fed to the grid of tube 56 through input coupling condenser 72. Resistor 74 is connected between the grid of tube 56** and ground.

Tube 56 is normally held at cutoff by the negative bias which results from the application of a large positive potential to its cathode through the voltage divider, which consists of resistors 76, 78 and 80 connected in series between B+ terminal 82 and ground. Resistor 84 is connected between the cathode of tube 56 and ground through bias divider resistor 76. Negative channel signal pulses are fed to the cathode of tube 56 from the pulse shaper circuit 36 through condenser 88. Tube 56 serves to convert the time modulated pulses from shaper 36 into pulse width modulated pulses in a conventional manner. The pulse width modulated output is then integrated in the conventional manner to convert the pulses into an amplitude varying signal corresponding to the original modulating signal at the transmitter.

The direct current amplifier used to control the ringing relay is contained in block 50*a* and comprises a pair of triode tubes 92 and 94 with direct coupling between the plate of tube 92 and the grid of tube 94. The cathode of tube 56 is connected to the grid of tube 92 through resistor 96. Resistor 98 is the plate resistor of tube 92 and is connected between the plate of tube 92 and B+ terminal 100. A suitable direct current potential is maintained on the cathode of tube 92 by virtue of said cathode being connected to B+ terminal 82 through bias divider resistor 80. As shown, the cathode of tube 92 is connected to ground through resistors 78 and 76.

The ringing relay 52*a* is connected between the plate tube 94 and B+ terminal 102. Tube 94 has its cathode returned to a constant source of direct current voltage at terminal 104.

The operation of the circuit shown in Figure 2 can best be understood by assuming that the B+ terminals 66, 100, 82 and 102 of the circuit, connected as shown in Figure 2, are supplied from a direct current voltage source with +250 volts, and that the gating pulse and the channel pulses, each have a potential of approximately 30 volts with a repetition rate of 8 kilocycles per second.

The unblocking gating pulse is coupled to the plate of tube 56 through the combination of resistor 58 and condenser 60 in series with condenser 62, and is also coupled to the grid of the same tube through condenser 72. The channel pulse is fed to the cathode of tube 56 through condenser 88.

Normally, tube 56 is held at cutoff by the application of a large positive potential, for example about 37 volts, to its cathode. Neither the gate pulse applied to the grid, nor the channel pulse fed to the cathode, decreases the positive cathode potential enough to cause plate current to flow in tube 56. So long as the gating pulse does not synchronize with the channel pulse the grid is maintained at the predetermined negative bias and tube 56 does not operate. However, when the positive gating pulse is applied to the grid simultaneously with the application of the negative channel pulse to the cathode, the potential on the grid with respect to the cathode will increase to the point where current will flow through tube 56 and resistors 84 and 76 to ground, causing the potential on the cathode to rise to about 47 volts.

As described above, when the gating pulse and the channel pulse are coincident tube 56 conducts. This fact is made use of in the present invention. Since the coupling capacitor 88 will charge when the grid of tube 56 is driven more positive and will discharge through the high value resistor 84, said resistor 84 acts in combination with condenser 88 to form a time-constant circuit. This R-C time constant is made sufficiently large compared with the period of 8 kilocycles per second so that condenser 88 remains essentially fully charged. Thus, the voltage on the cathode of tube 56 has one value when the channel pulse is present and a lower value when the channel pulse is absent. This differential of about 10 volts is utilized to operate the direct current amplifier including triode tubes 92 and 94.

When the channel pulse is present and is coincident with its respective gating pulse the potential on the cathode of tube 56 rises to about 47 volts. This increased cathode voltage is applied through resistor 96 to the grid of tube 92. However, a constant operative potential of about 44 volts is applied to the cathode of tube 92 through resistor 80. Since the positive potential applied to the grid of tube 92 exceeds the predetermined value on the cathode, current will flow in the output circuit of tube 92.

While current is flowing in the output circuit of tube 92, the anode potential of this tube will approximately 55 volts and in turn be applied to the grid of tube 94. Since the cathode of tube 94 is returned to a constant direct current potential source 104 whose value is assumed to be 75 volts, tube 94 will be cut off and not operate.

To initiate the operation of the direct current relay 52*a*, the preselected channel signal is deleted by closing switch 18*a*, shown in Figure 1, which will automatically cut off tube 56. The potential on the cathode of tube 56 will revert to its normal bias of 37 volts which is applied to the grid of tube 92. Tube 92 is held at cutoff by the negative bias which results from the application of the positive potential of 44 volts maintained to its cathode by the voltage divider 80. When the current flowing through tube 92 is cut off, the voltage at its anode will approach the value of the B+ voltages and will cause tube 94 to conduct and actuate the direct current ringing relay 52*a* which can be utilized to transfer a 20 cycle ringing voltage to the selected telephone channel.

The invention, therefore, provides a system where ringing circuits in each channel can be actuated without time modulating the pulses. This circuit will also follow dialing pulses if the R–C time constant mentioned above is made large relative to the period of the 8 kilocycle pulses but small compared with the period of dialing pulses.

Although only three channels have been illustrated in the particular embodiment shown, it will be evident that many more channels can be used dependent upon specific requirements. In order to illustrate the effectiveness of the invention, it can be stated by way of example that in actual practice as many as forty-five channels have been successfully utilized to which the direct current ringing system has been applied.

While there has been described what is at present considered a preferred embodiment of this invention, it will be obvious to those skilled in the art that various changes and modifications may be made therein without departing from the invention, and it is, therefore aimed in the appended claim to cover all such changes and modifications as fall within the true spirit and scope of the invention.

What is claimed is:

In a pulse communication system including means for transmitting a series of pulse trains, each of said pulse trains including a synchronizing signal and a plurality of equally spaced channel signals, means for receiving said pulse trains through a common medium interconnecting said transmitting and receiving means and including means to separate said pulse trains into separate channel pulses, and means responsive to said synchronizing signal to produce a gate pulse synchronized with each of said channel signals; the combination therewith of control means comprising a circuit coupled to said receiving means and including an electron tube and a ringing circuit controlled thereby, said electron tube having a plate, grid and cathode, means for applying said gate pulse to the plate and grid of said electron tube, means for applying said selected channel signal to the cathode of said electron tube, said electron tube being rendered conductive only when said gate pulse and said channel signal are coincident, whereby the potential on said cathode of said electron tube has a different value when said selected channel signal is present than when it is absent, said ringing circuit being coupled to the cathode of said electron tube and means at said transmitting means for deleting any of said channel signals to produce a voltage variation on said cathode and operate said ringing circuit.

References Cited in the file of this patent

UNITED STATES PATENTS 2,438,902 Deloraine ------------ Apr. 6, 1948